(12) United States Patent
Saxe et al.

(10) Patent No.: US 7,443,222 B1
(45) Date of Patent: Oct. 28, 2008

(54) DYNAMIC CLOCK CONTROL

(75) Inventors: Timothy Saxe, Los Altos, CA (US); Senani Gunaratna, Los Gatos, CA (US); Stephen U. Yao, Markham (CA)

(73) Assignee: QuickLogic Corporation, Sunnyvale, CA (US)

( * ) Notice: Subject to any disclaimer, the term of this patent is extended or adjusted under 35 U.S.C. 154(b) by 5 days.

(21) Appl. No.: 11/753,531

(22) Filed: May 24, 2007

(51) Int. Cl.
*G06F 1/04* (2006.01)

(52) U.S. Cl. .......................................... 327/291; 326/93

(58) Field of Classification Search ................ 327/166, 327/292, 298, 299
See application file for complete search history.

(56) References Cited

U.S. PATENT DOCUMENTS

| | | | | |
|---|---|---|---|---|
| 6,204,695 | B1* | 3/2001 | Alfke et al. | 326/93 |
| 6,472,909 | B1* | 10/2002 | Young | 327/99 |
| 6,507,230 | B1* | 1/2003 | Milton | 327/291 |
| 7,245,167 | B2* | 7/2007 | Mahrla | 327/291 |
| 7,274,240 | B2* | 9/2007 | Siegler et al. | 327/291 |

* cited by examiner

*Primary Examiner*—Lincoln Donovan
*Assistant Examiner*—William Hernandez (57) ABSTRACT

An implementation of an apparatus and method to generate a dynamically controlled clock is provided. The resulting clock reduces otherwise produced narrow clock pulses and allows for control from two separate control signals. A first control signal indicates a low power mode, for example a chip-wide low power mode. A second control signal indicates a user-selected mode to shutdown a selected clock.

20 Claims, 6 Drawing Sheets

DYNAMIC CLOCK CONTROL

CROSS-REFERENCE TO RELATED APPLICATIONS

None.

BACKGROUND OF THE INVENTION

1. Field of the Invention

The invention relates generally to clock generation in a programmable logic device and more specifically to elimination of abnormally narrow pulses from a dynamically controlled clock.

2. Background of the Invention

This application relates to U.S. application Ser. No. 11/563,632 (the '632 application), titled "Low Power Mode" and filed Nov. 27, 2006, which is incorporated herein by reference. In the '632 application, describes reducing power consumption across a switch, such as an unprogrammed antifuse. The power reduction applies to antifuses, transistor based switches, (e.g., FLASH, EEPROM and/or SRAM) and other devices exhibiting a leakage current, especially during a sleep or stand-by mode. During a sleep mode, such switches may be uncoupled from signals driving the switches. Next terminals of each switch may be coupled to a common potential or allowed to float to a common potential thereby eliminating or reducing leakage currents through the switches.

In the '632 application, clocks are disabled (601 in FIG. 6A) and enabled (616 in FIG. 6B) when respectively entering and exiting a sleep mode. When the clocks are dynamically controlled (i.e., disabled and enabled during runtime), a last pulse before being disabled and a first pulse when being re-enabled may be arbitrarily narrow. Such narrow pulses in a conventional system may lead to uncertain clocking of components. Therefore, a need exists to provide a regulated pulse with for a system having a dynamic clock control and a low power mode.

SUMMARY

Some embodiments of the present invention provide for circuitry to generate a dynamically controlled clock, the circuitry comprising: a clock input terminal to couple to a running clock; a first input terminal to couple to a first control signal from a programmed antifuse; a second input terminal to couple to a second control signal indicative of a switching fabric state; an output terminal to provide the dynamically controlled clock; a first gate comprising a first data input port coupled to the clock input terminal; a second data input port; and a data output port coupled to the output terminal; a clock generator comprising a clock generator input port coupled to the clock input terminal; and a clock generator output port to provide an internal clock out-of-phase from the running clock; a register comprising a register clock input port coupled to the clock generator output port; a register data input port coupled to the first input terminal; and a register data output port coupled to the second data input port of the first gate; wherein the second input terminal is coupled to switch a signal to one of the clock generator input port and the register data input port.

Some embodiments of the present invention provide for a method for generating a dynamically controlled clock, the method comprising: providing a running clock; providing a first control signal from a programmed antifuse; providing a second control signal indicative of a switching fabric state; passing, through a multiplexer, the first control signal as a register input data signal to a register data input port of a register, when the second control signal is a first state; clocking the register data input signal from the register data input port as a register data output signal to a register data output port; feeding back, through the multiplexer, the register data output signal to the register data input port, when the second control signal is a second state; and combining, at a first gate, the running clock and the register data output signal to generate the dynamically controlled clock.

Some embodiments of the present invention provide for circuitry to generate a dynamically controlled clock, the circuitry comprising: a clock input terminal to couple to a running clock; a first input terminal to couple to a first control signal from a programmed antifuse; a second input terminal to couple to a second control signal indicative of a switching fabric state; an output terminal to provide the dynamically controlled clock; a first gate comprising a first data input port coupled to the clock input terminal; a second data input port; and a data output port coupled to the output terminal; a clock generator comprising a clock generator input port coupled to the clock input terminal; and a clock generator output port to provide an internal clock out-of-phase from the running clock; a register comprising a register clock input port coupled to the clock generator output port; a register data input port; and a register data output port; a second gate comprising a first data input port coupled to the register data output port; a second data input port coupled to the second input terminal; and a data output port coupled to the second data input port of the first gate; and a multiplexer comprising a multiplexer first data input port coupled to the register data output port; a multiplexer second data input port coupled to the first input terminal; a multiplexer data output port coupled to the register data input port; and a multiplexer control port coupled to the second input terminal.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

The ability to turn off segments of electronic circuitry dynamically helps to reduce total dynamic power consumption. Circuitry may be turned off by disabling clocks that services that segment of the circuitry. During runtime, one segment of logic may dynamically turn off all of its clocks using either an external control signal or an internally generated control signal. To make this dynamic clock control more useful, the disabling and subsequent enabling may be done asynchronous to the clock while built-in control circuitry guarantees the internal dynamically controlled clocks make a smooth transition from enable to disable (and from disable to enable) with all clock pulses having a full pulse width or no pulse at all. Without proper dynamic clock control, an internal clock signal may have a pulse that is unfortunately not a full width pulse, such as in the circuitry discussed immediately below.

Figure 1:
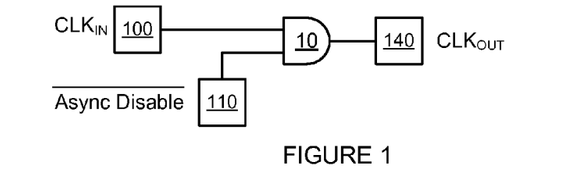
FIG. 1 shows circuitry to disable a running clock.

FIG. 1 shows circuitry to disable a running clock. A first gate (AND gate) 10 has a first data input port, a second data input port and a data output port. The first data input port is connected to a clock input terminal 100, which carries a running clock ($CLK_{IN}$). The second data input port is connected to a control input terminal 110, which carries a first control signal ($\overline{AsyncDisable}$). The data output port of the first gate 10 is connected to an output terminal 140. A dynamically controlled clock is generated by the first gate 10 and sent to the output terminal 140 as a first gate output signal.

Figure 2A:
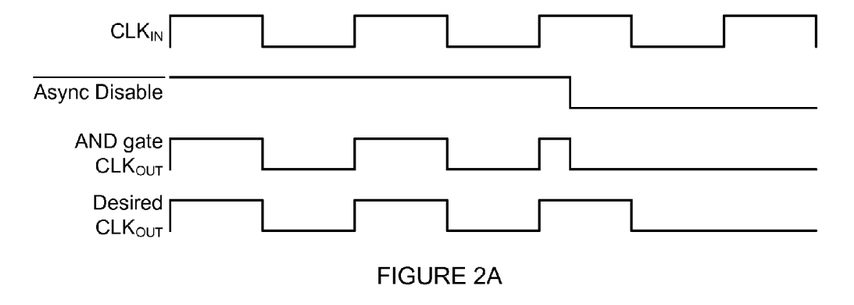
FIGS. 2A and 2B show waveforms associated with FIG. 1.
Figure 2B:
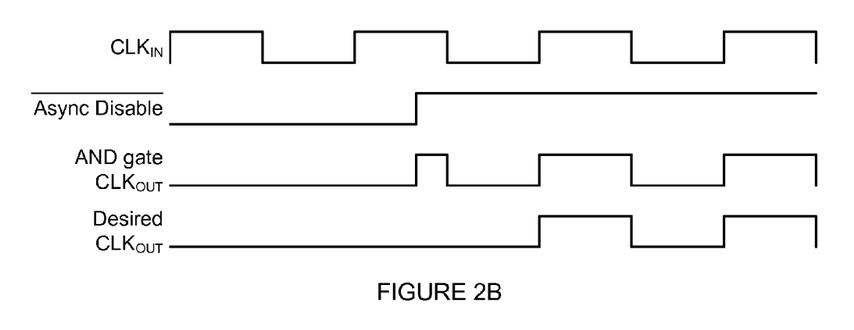

FIGS. 2A and 2B show waveforms associated with FIG. 1, including a running clock ($CLK_{IN}$), a first control signal ($\overline{AsyncDisable}$), a first gate output signal (AND gate $CLK_{OUT}$) and a desired output signal (Desired $CLK_{OUT}$). The first control signal ($\overline{AsyncDisable}$) has transitions that are asynchronously timed with respect to the transitions of the running clock ($CLK_{IN}$). That is, transitions in $\overline{AsyncDisable}$ occur independently from transitions of $CLK_{IN}$. In both figures, the running clock ($CLK_{IN}$) is shown as a 50 percent duty cycle signal running over multiple periods.

In FIG. 2A, the first control signal ($\overline{AsyncDisable}$) transitions to an active state midway during a $CLK_{IN}$ high period. The $CLK_{IN}$ and $\overline{AsyncDisable}$ signal waveforms are applied to the respective first and second data input ports of the first gate (AND gate) 10. The $CLK_{OUT}$ waveform from the first gate data output port shows an abnormally narrow pulse resulting from the $\overline{AsyncDisable}$ signal changing states while the running clock was high. Since the transition of the $\overline{AsyncDisable}$ signal occurs asynchronously from transitions in the running clock ($CLK_{IN}$), the pulse width of the final high period of the first gate data output signal of the first gate 210 is uncertain. The final pulse of the desired output signal (desired $CLK_{OUT}$) does not have an unpredictable pulse but rather a full pulse width as shown.

Similarly, in FIG. 2B, the $\overline{AsyncDisable}$ signal transitions to an inactive state midway during a $CLK_{IN}$ high period. Again, the resulting $CLK_{OUT}$ waveform from the first gate data output port shows an abnormally narrow pulse resulting from the $\overline{AsyncDisable}$ signal changing states while a running clock is high. As shown, the $\overline{AsyncDisable}$ signal transitions asynchronously from transitions in the running clock ($CLK_{IN}$). The pulse width of the initial high period of the first gate data output signal (AND gate $CLK_{OUT}$) is again uncertain. The initial pulse of the desired output signal (desired $CLK_{OUT}$) does have a certain pulse.

Figure 3:
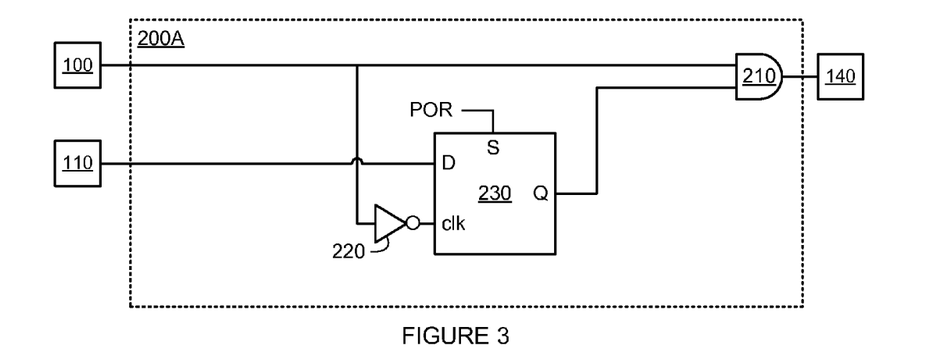
FIG. 3 shows circuitry to eliminate abnormally narrow pulses from a dynamically controlled clock.

FIG. 3 shows circuitry 200A to eliminate abnormally narrow pulses from a dynamically controlled clock. Circuitry 200A guarantees a smooth transition back and forth between a clock disabled state and a clock enabled state, such as during the low power mode transitions. Circuitry 200A includes a first gate (AND gate) 210, an inverter 220 and a register 230. Also shown are a clock input terminal 100, a first input terminal 110 and an output terminal 140. In operation, the clock input terminal 100 carries a running clock ($CLK_{IN}$) and the first input terminal 110 carries a first control signal, such as an asynchronous disable signal ($\overline{AsyncDisable}$). The output terminal 140 provides the dynamically controlled clock (desired $CLK_{OUT}$) to other circuits (not shown). These terminals 100, 110 and 140 may be each be a physical connector pad, a conductive lead, a wire, a conductive trace, another conductor, or other communications element for passing a signal.

The first gate 210 includes a first data input port electrically connected to the clock input terminal 100, a second data input port electrically connected to a data output port (Q) of the register 230, and a data output port electrically connected to the output terminal 140. The inverter 220 performs a clock generator function to generate a clock that is out of phase from the running clock. The clock generator function of inverter 220 may be implemented with an inverter, a NAND gate, a NOR gate, a delay line or the like. The inverter 220 has an input port electrically connected to the clock input terminal 100 and an output port to provide an internal clock that is out of phase from the running clock. The register 230 includes a register clock input port (clk) electrically connected to the output port of the inverter 220.

The register 230 also includes a data input port (D) electrically connected to receive the first control signal from the first input terminal 110. Using an out-of-phase clock, the register 230 may capture an input signal on its data input port (D) during a period not including an active transition of the running clock. As shown, the register 230 also includes data output port (Q) electrically connected to the second data input port of the first gate 210. The register 230 may also include an initialization port (S or Set) electrically connected to an initialization signal (POR or Power-on-Reset). On initialization, the initialization signal (POR) may be used to set the output signal at data output port (Q) to a known state.

Figure 4A:
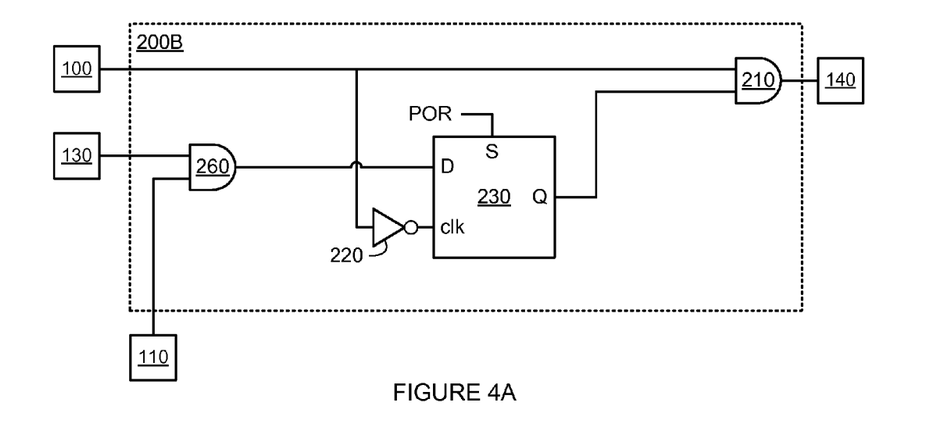
FIGS. 4A and 4B show circuitry to eliminate abnormally narrow pulses from a dynamically controlled clock when two independent disable control signals exist.
Figure 4B:
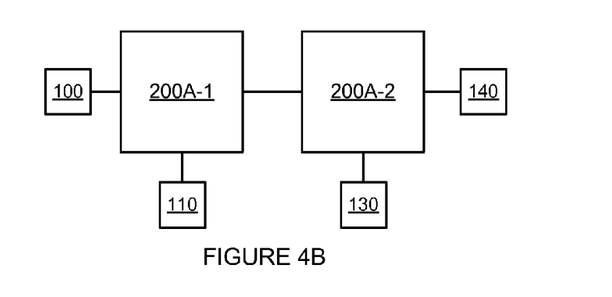

FIGS. 4A and 4B show circuitry 200 to eliminate abnormally narrow pulses from a dynamically controlled clock when two independent control signals exist.

In FIG. 4A, the circuitry 200A of FIG. 3 is augmented with a second gate (AND gate) 260 and a second input terminal 130 to form circuitry 200B. The second gate 260 includes a first data input port electrically connected to the first input terminal 110 and a second data input port electrically connected to the second input terminal 130. The second gate 260 also includes a data output port electrically connected to the data input port (D) of the register 230. The first input terminal 110 and the second input terminal 130 may each be a source of an independent control signal that may be asynchronous to the other control signal and is asynchronous to the running clock ($CLK_{IN}$). Therefore, either control signal may independently cause circuitry 200B to drive the dynamically controlled clock at the output terminal 140 to low value.

In FIG. 4B, the function of the AND gate 210 of combining to control signals in circuitry 200B is alternative implemented by daisy chaining two instances of circuitry 200A (200A-1 and 200A-2). The circuitry 200A of FIG. 3 is included as first stage circuitry 200A-1 connected to second stage circuitry 200A-2. The running clock at the clock input terminal 100 and the first control signal at the first input terminal 110 are fed as input signals to stage one circuitry 200A-1. Stage one circuitry 200A-1 provides its output signal at a terminal that is used by stage two circuitry 200A-2 as an input terminal to carry an input clock. Stage two circuitry 200A-2 accepts the input clock from stage one circuitry 200A-1 as well as a second control signal from input terminal 130. The resulting dynamically controlled clock is provided at output terminal 140.

Figure 5:
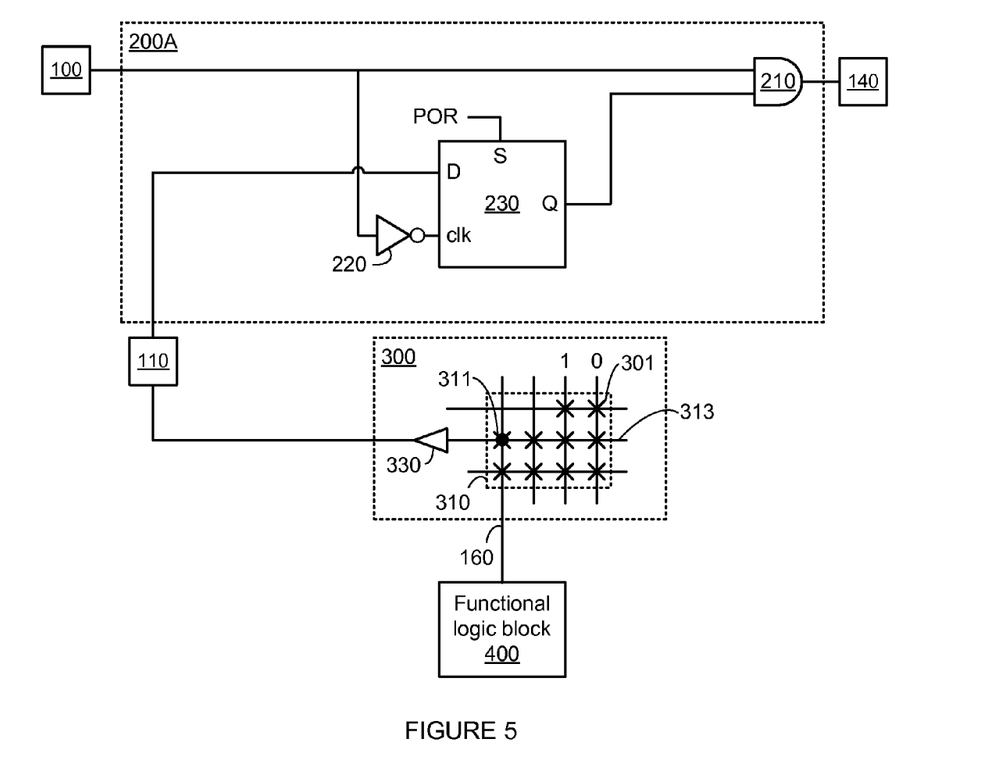
FIG. 5 shows circuitry to eliminate abnormally narrow pulses based on a first control signal that passes through an antifuse switching fabric, in accordance with embodiments of the present invention.

FIG. 5 shows circuitry 200A to eliminate abnormally narrow pulses based on a first control signal that passes through an antifuse switching fabric 300, in accordance with embodiments of the present invention. The switching fabric 300 includes an array of antifuses 310. Some of these antifuses are unprogrammed antifuse (e.g., 301) while others may be programmed antifuses (e.g., 311). The array of antifuses 310 may be arranged in a grid pattern with each antifuses positioned at an intersection of a pair of a horizontal conductor and a vertical conductor. An unprogrammed antifuse 301 provides a path of high resistance and therefore insulates a horizontal conductor from a vertical conductor. On the other hand, a programmed antifuses (e.g., 311) is a path of low resistance and electrically couples the horizontal conductor 313 to the vertical conductor 160. As shown, a first conductor 313 is electrically connected to the first sequence of antifuses. If an antifuses is programmed, the antifuses conducts a signal at that intersection between the horizontal and vertical conductors. For example, a signal on a vertical conductor (e.g., 160) is conducted to a horizontal conductor (e.g., 313) by programmed antifuse at that intersection (e.g., 311).

In operation, the first control signal may be generated from a functional logic block 400, such as from an application specific integrated circuit (ASIC). The functional logic block 400 generates the first control signal and provides this signal on a vertical conductor 160. Conductor 160 is electrically connected to horizontal conductor 313 via program antifuse 311. A first buffer 330 has a data input port electrically connected to horizontal conductor 313 to accept the first control signal. The first buffer 330 also has a data output port electrically connected to the first terminal 110 to provide the first control signal to circuitry 200A. The first buffer 330 conditions the first control signal to be an input signal to circuitry 200A via the first input terminal 110.

Some chips provide a low power mode where one or more sections of the chip are powered down. If a low power mode disables a functional logic block, such as from functional logic block 400, a logic high signal from buffer 330 may have an unknown state or may be driven to a zero value. In this case, the high logic signal provided to data input port (D) of register 230 via the first input terminal 110 may be changed to a logic low signal. In response to the next active clock transition at the internal clock at clock input port (clk) of register 230, the register 230 may unwantingly latch a logic low signal to data output port (Q) of the register 230.

Figure 6:
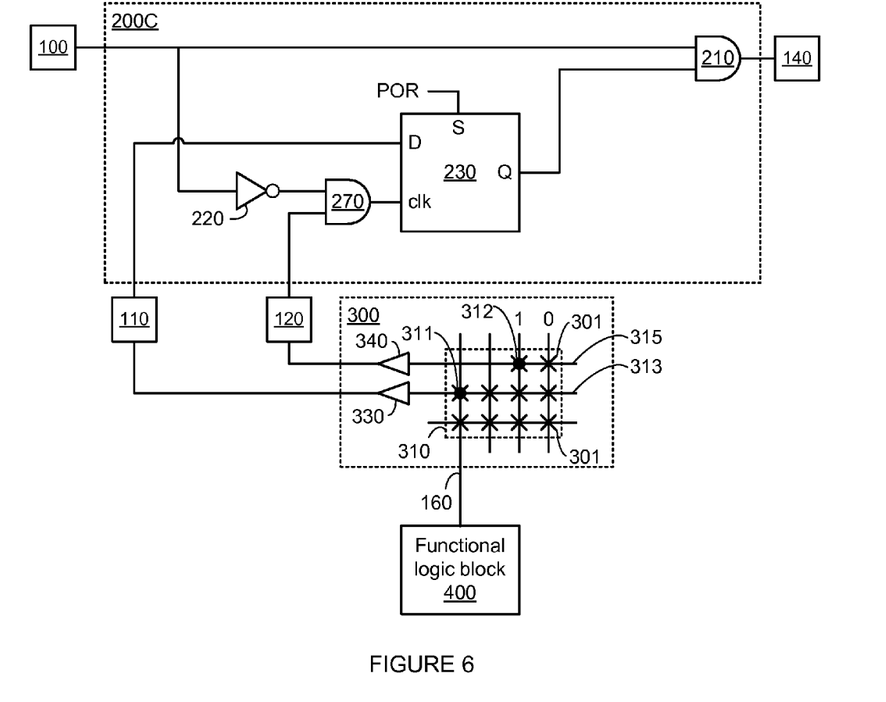
FIGS. 6 and 7 show circuitry to eliminate abnormally narrow pulses based on a first control signal that passes through an antifuse switching fabric and also based on a second control signal also from the antifuse switching fabric, in accordance with embodiments of the present invention.
Figure 7:
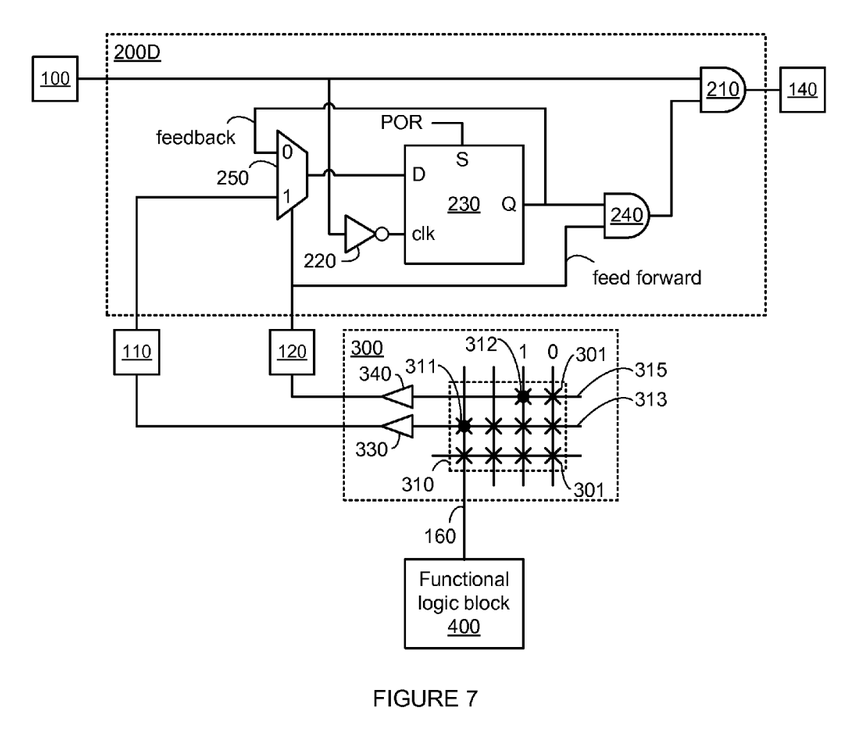

FIGS. 6 and 7 show circuitry 200C and 200D to eliminate abnormally narrow pulses based on a first control signal that passes through an antifuse switching fabric and also based on a second control signal from the antifuse switching fabric, in accordance with embodiments of the present invention.

In FIG. 6, the circuitry 200A of FIG. 5 is modified to include an AND gate 270 positioned between the inverter 220 and the clock input port (clk) of register 230. Specifically, a first data input port of the AND gate 270 is electrically connected to the output port of the inverter 220. A second data input port of the AND gate 270 is electrically connected to a second input terminal 120. The output port of the AND gate 270 is electrically connected to the clock input port (clk) of register 230. Additionally, the switching fabric 300 includes a second buffer 240 having an output port electrically connected to the second input terminal 120. The input port of the second buffer 240 is electrically connected to a second horizontal conductor 315, which may be connected to a row of antifuse. The second horizontal conductor 315 is electrically connected to a logic one signal (e.g., through a programmed antifuse 312).

A second control signal is provided by the switching fabric 300 through the second buffer 340 to the second input terminal 120. This second control signal is indicative of a state of the switching fabric 300. That is, when the switching fabric 300 is operating normally, the logic one signal is provided as the second control signal. When the switching fabric 300 is operating in a low power mode, the logic one signal is lost. The data output port of the second buffer 340 is also lost. Therefore, during a low power mode, the second control signal may be indeterminate whereas, during normal operations, the second control signal may be high.

In operation, a first control signal may transition high or low depending on the functional logic block 400 during non-low power mode operations. The second control signal transitions high or low depending on the current power mode or power state of the switching fabric 300. The running clock at the input port of the output of AND gate 210 is gated to form a dynamically controlled clock at the output terminal 140. The gating is controlled by the data output port (Q) of the register 230. The data output port (Q) of the register 230 may be driven to a low value after a full clock pulse is allowed to pass to the output terminal 140. A full pulse passes after the signal at the clock input port (clk) of register 230 is driven to a low value by the second control signal from the second input terminal 120. The second control signal is driven low when entering a low power mode or when the data input port (D) of the register 230 is driven to a low value by the first control signal from the first input terminal 110.

In FIG. 7, the circuitry 200A of FIG. 3 is modified to include an AND gate 240 and a multiplexer (MUX) 250 as well as a feedback line and a feed forward line thereby forming circuitry 200D. Circuitry 200D includes a first gate (AND gate 210), an inverter 220, a register 230, a second gate (AND gate 240) and a MUX 250. A running clock is provided at a clock input terminal 110. The clock input terminal 110 is electrically connected to an input port of the inverter 220 and to a first data input port of the first gate 210. The data output port of the first gate 210 is electrically connected to an output terminal 140 to provide a dynamically controlled clock. An output terminal of the inverter 220 is connected to the clock input port (clk) of register 230. The second gate 240 has a data output port connected to a second data input port of the first gate 210. The second gate 240 also has a first data input port connected to the data output port (Q) of the register 230 and a second data input port connected to the second input terminal 120 as a feed forward signal. In some embodiments, the feed forward signal and the second gate 240 are not present and the data output port (Q) is connected to the first gate 210 without intervention.

The second input terminal 120 is also connected to a selection port of the MUX 250. The MUX 250 further includes a data output port connected to the data input port (D) of the register 230, a first mux input port connected to the data output port (Q) of the register 230 as a feedback signal and a second mux input port connected to the first input terminal 110. The feedback signal aides to prevent premature enabling of the dynamically controlled clock when circuitry is waking up from a low power mode. The register 230 may include a set port (S) connected to a power on reset (POR) signal.

The switching fabric 300 includes a first buffer 330 having a data output port connected to the first input terminal 110 and a data input port connected to a first conductor 313. The first conductor 313 provides a first control signal from a functional logic block 400 to the data input port of the first buffer 330. The first control signal may be provided directly (not shown) or may be provided through a programmed antifuse 311 a conductor 160 connecting the functional logic block 400 to the switching fabric 300. The switching fabric 300 also includes a second buffer 340 having a data output port connected to the second input terminal 120 and a data input port connected to receive a second control signal from a second conductor 315. The second conductor 315 may be directly connected to the second control signal (not shown) or may connected through a programmed antifuse 312 from a conductor connecting a logic one signal to the switching fabric 300.

The MUX 250 passes the first control signal from the first input terminal 110 when the selection port is provided a logic high signal and passes the feedback signal when the selection port is provided a logic low signal. The feedback signal allows the register to loop a last valid input signal provided to the register 230 before a low power mode was entered. In doing so, during exiting from the low power mode, the proper signal is provided at the data output port (Q) of the register 230.

Figure 8:
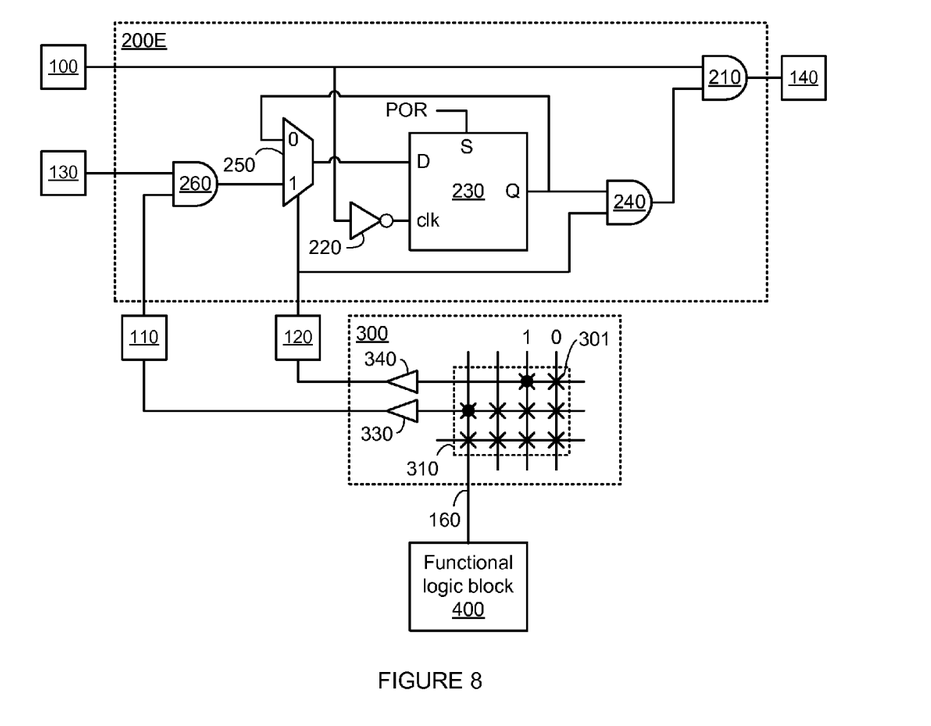
FIG. 8 shows circuitry to eliminate abnormally narrow pulses from a dynamically controlled clock when two independent disable control signals exist, in accordance with embodiments of the present invention.

FIG. 8 shows circuitry 200E to eliminate abnormally narrow pulses from a dynamically controlled clock when two independent disable control signals exist, in accordance with embodiments of the present invention. Circuitry 200E adds a third gate 260 to the circuitry 200D of FIG. 7. Circuitry 200E maybe used to eliminate abnormally narrow pulses from a dynamically controlled clock when multiple independent disable control signals exist. The third gate 260 is positioned between the first input terminal 110 and the MUX 250. Specifically, the third gate 260 includes a data output port connected to the first mux input port of MUX 250. The third gate 260 also includes a first data input port connected to the first input terminal 110 and a second data input port connected to a third input terminal 130.

In operation, a first control signal from a functional logic block 400 may be supplied to circuitry 200E via the first input terminal 110. A second control signal from the switching fabric 300 may be supplied to circuitry 200E via the second input terminal 120. A third control signal for an external source, such as a microcontroller or system logic, may be supplied to circuitry 200E via the third input terminal 130. The third control signal may be a system signal indicating entry into a low power mode.

In some embodiments, the first control signal is a dynamic enable/disable signal (CLK_EN1) that may be controlled by an input pad (such as terminal 110). In other embodiments, the first control signal is a dynamic enable/disable signal (CLK_EN1) that may be controlled by an internally generated signal (such as by functional logic block 400). In some embodiments, the second control signal is a signal (CLK_EN2) that provides a timing control signal to transition into and out of a low power mode. In some embodiments, during a low power mode, the routing wires (e.g, 160, 313, 315) will be driven to a common potential (e.g., 0 Volts). These routing wires may no longer have valid data when in a low power mode. That is, both CLK_EN1 and CLK_EN2 may be at 0 Volts during a low power mode.

A system level signal (VLP) may be used to indicate entry into or exit out of a very low power mode. The VLP changing to indicate entry into a low power mode may lead to a disable clock signal (VLP_CLKDIS) becoming active. This signal may be applied as a control signal to the third input terminal 130. After clocks have been fully disabled, a control signal (VLP_DATAD) may be generated to indicate whether data signals are available (because circuitry is not in a low power mode) or not available (because circuitry is in a low power mode). The VLP_DATAD signal may transition to a low power mode state after clocks have been fully disabled, which may be 10 to 20 microseconds in some embodiments. When the system very low power mode signal (VLP) indicates the system is coming out of a low power mode, the VLP_DATAD signal will indicate the data signal are available after a few gate propagation periods. The VLP_CLKDIS will then transition after a time for data to be stable on the re-enabled logic, which may be 10 to 20 microseconds in some embodiments.

In operation, the CLK_EN1 and CLK_EN2 signals may both be set to a static low signal, which permanently disables the dynamically controlled clock. Alternatively, the CLK_EN1 and CLK_EN2 signals may both be set to a static high signal, which permanently enables the dynamically controlled clock. Alternatively, the CLK_EN1 signal may be set to a dynamic signal driven by logic, such as functional logic block 400, and the CLK_EN2 signal may be set to a static high signal. In this configuration with the CLK_EN1 signal coupled to a dynamic signal, a logic low value on the dynamic signal dynamically disables the dynamically controlled clock and a logic high value on the dynamic signal dynamically enables the dynamically controlled clock.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. Circuitry to generate a dynamically controlled clock, the circuitry comprising:
    a clock input terminal to couple to a running clock;
    a first input terminal to couple to a first control signal from a programmed antifuse;
    a second input terminal to couple to a second control signal indicative of a switching fabric state;
    an output terminal to provide the dynamically controlled clock;
    a first gate comprising
        a first data input port coupled to the clock input terminal;
        a second data input port; and
        a data output port coupled to the output terminal;
    a clock generator comprising
        a clock generator input port coupled to the clock input terminal; and
        a clock generator output port to provide an internal clock out-of-phase from the running clock;
    a register comprising
        a register clock input port coupled to the clock generator output port;

a register data input port coupled to the first input terminal; and a register data output port coupled to the second data input port of the first gate;

wherein the second input terminal is coupled to switch a signal to one of the clock generator input port and the register data input port.

2. The circuitry of claim 1, wherein the clock generator comprises an inverter comprising:

an input port at the clock generator input port; and an output port at the clock generator output port.

3. The circuitry of claim 1, further comprising:

a second gate comprising a first data input port coupled to the register data output port;

a second data input port coupled to the second input terminal; and a data output port coupled to the second data input port of the first gate.

4. The circuitry of claim 1, wherein the second input terminal is coupled to switch a signal to the register data input port.

5. The circuitry of claim 1, further comprising:

a multiplexer comprising a multiplexer first data input port coupled to the register data output port;

a multiplexer second data input port coupled to the first input terminal;

a multiplexer data output port coupled to the register data input port; and a multiplexer control port coupled to the second input terminal.

6. The circuitry of claim 5, further comprising:

a third input terminal to couple to a third control signal indicative of a low power mode; and a third gate comprising a first data input port coupled to the third input terminal;

a second data input port coupled to the first input terminal; and a data output port coupled to the multiplexer second data input port.

7. The circuitry of claim 1, wherein the register further comprises an initialization port to couple to an initialization signal.

8. The circuitry of claim 1, further comprising:

a first conductor coupled to a first plurality of antifuses; and a first buffer comprising a data input port coupled to the first conductor; and a data output port coupled to the first input terminal.

9. The circuitry of claim 7, further comprising:

a second conductor coupled to a second plurality of antifuses; and a second buffer comprising a data input port coupled to the second conductor; and a data output port coupled to the second input terminal.

10. The circuitry of claim 1, wherein the first control signal comprises an application specific integrated circuit (ASIC) control signal.

11. The circuitry of claim 1, wherein the first gate is an AND gate.

12. A method for generating a dynamically controlled clock, the method comprising:

providing a running clock;

providing a first control signal from a programmed antifuse;

providing a second control signal indicative of a switching fabric state;

passing, through a multiplexer, the first control signal as a register input data signal to a register data input port of a register, when the second control signal is a first state;

clocking the register data input signal from the register data input port as a register data output signal to a register data output port;

feeding back, through the multiplexer, the register data output signal to the register data input port, when the second control signal is a second state; and combining, at a first gate, the running clock and the register data output signal to generate the dynamically controlled clock.

13. The method of claim 12, further comprising:

generating an internal clock from the running clock;

wherein the act of clocking the register data input signal comprises clocking the register with the inverted running clock.

14. The method of claim 13, wherein the act of generating the internal clock comprises inverting the running clock.

15. The method of claim 12, further comprising:

combining, at a second gate, the register data output signal and the second control signal to generate an output control signal;

wherein the act of combining the running clock and the register data output signal comprises combining, at the first gate, the running clock and the output control signal.

16. The method of claim 12, wherein the act of providing the first control signal from the programmed antifuse comprises:

receiving a first received signal from a first conductor coupled to the programmed antifuse; and buffering the first received signal to generate the first control signal.

17. The method of claim 16, wherein the act of providing the second control signal comprises:

receiving a second received signal from a second conductor coupled to a programmed antifuse; and buffering the second received signal to generate the second control signal.

18. Circuitry to generate a dynamically controlled clock, the circuitry comprising:

a clock input terminal to couple to a running clock;

a first input terminal to couple to a first control signal from a programmed antifuse;

a second input terminal to couple to a second control signal indicative of a switching fabric state;

an output terminal to provide the dynamically controlled clock;

a first gate comprising a first data input port coupled to the clock input terminal;

a second data input port; and a data output port coupled to the output terminal;

a clock generator comprising a clock generator input port coupled to the clock input terminal; and a clock generator output port to provide an internal clock out-of-phase from the running clock;

a register comprising a register clock input port coupled to the clock generator output port;

a register data input port; and a register data output port;

a second gate comprising a first data input port coupled to the register data output port;

a second data input port coupled to the second input terminal; and
a data output port coupled to the second data input port of the first gate; and a multiplexer comprising
a multiplexer first data input port coupled to the register data output port;
a multiplexer second data input port coupled to the first input terminal;
a multiplexer data output port coupled to the register data input port; and
a multiplexer control port coupled to the second input terminal.

19. The circuitry of claim 18, further comprising:
a third input terminal to couple to a third control signal indicative of a low power mode; and
a third gate comprising
a first data input port coupled to the third input terminal;
a second data input port coupled to the first input terminal; and
a data output port coupled to the multiplexer second data input port.

20. The circuitry of claim 18, further comprising:
a first conductor coupled to a first plurality of antifuses;
a first buffer comprising
a data input port coupled to the first conductor; and
a data output port coupled to the first input terminal;
a second conductor coupled to a second plurality of antifuses; and
a second buffer comprising
a data input port coupled to the second conductor; and
a data output port coupled to the second input terminal.

* * * * *